United States Patent [19]

Sirimarco

[11] 4,254,760
[45] Mar. 10, 1981

[54] CERAMIC HEAT ABSORPTION PANEL

[76] Inventor: Robert A. Sirimarco, 966 Linley Ct., Denver, Colo. 80204

[21] Appl. No.: 944,764

[22] Filed: Sep. 22, 1978

[51] Int. Cl.³ .................................................. F24J 3/02
[52] U.S. Cl. .................................................. 126/449
[58] Field of Search ............... 126/270, 271, 449, 439, 126/438, 450; 237/1 A; 165/168, 170, 152

[56] References Cited

U.S. PATENT DOCUMENTS

| 3,208,447 | 9/1965 | Laszlo | 126/270 |
|---|---|---|---|
| 3,279,457 | 10/1966 | Kyryluk | 126/270 |
| 3,985,116 | 10/1976 | Kapany | 126/450 |
| 4,051,832 | 10/1977 | Stelzer | 126/450 |
| 4,079,724 | 3/1978 | Zwillinger | 126/439 |
| 4,106,479 | 8/1978 | Rogers | 126/270 |
| 4,141,338 | 2/1979 | Lof | 126/270 |

FOREIGN PATENT DOCUMENTS

| 2644050 | 4/1977 | Fed. Rep. of Germany | 126/271 |
|---|---|---|---|
| 762759 | 9/1934 | France | 126/271 |
| 2284836 | 4/1976 | France | 126/271 |
| 2306410 | 10/1976 | France | 126/429 |

*Primary Examiner*—James C. Young
*Attorney, Agent, or Firm*—John E. Reilly

[57] ABSTRACT

Solar collector apparatus includes a ceramic absorber panel comprised of a plurality of hollow, generally pyramidal-shaped elements with open bases positioned in a common plane in staggered formation with the open bases adapted to be oriented toward the sun to receive radiant energy from the sun and the apex of each of the pyramidal-shaped elements terminating in a projection which is circular in cross-section protruding outwardly from the apex and tapering to a point on its distal end. An insulated frame assembly is provided under the absorber panel to support the absorber panel and to form an air flow duct beneath the absorber panel for conducting a stream of air as a heat transfer medium in contact with the apices and protruding members.

12 Claims, 10 Drawing Figures

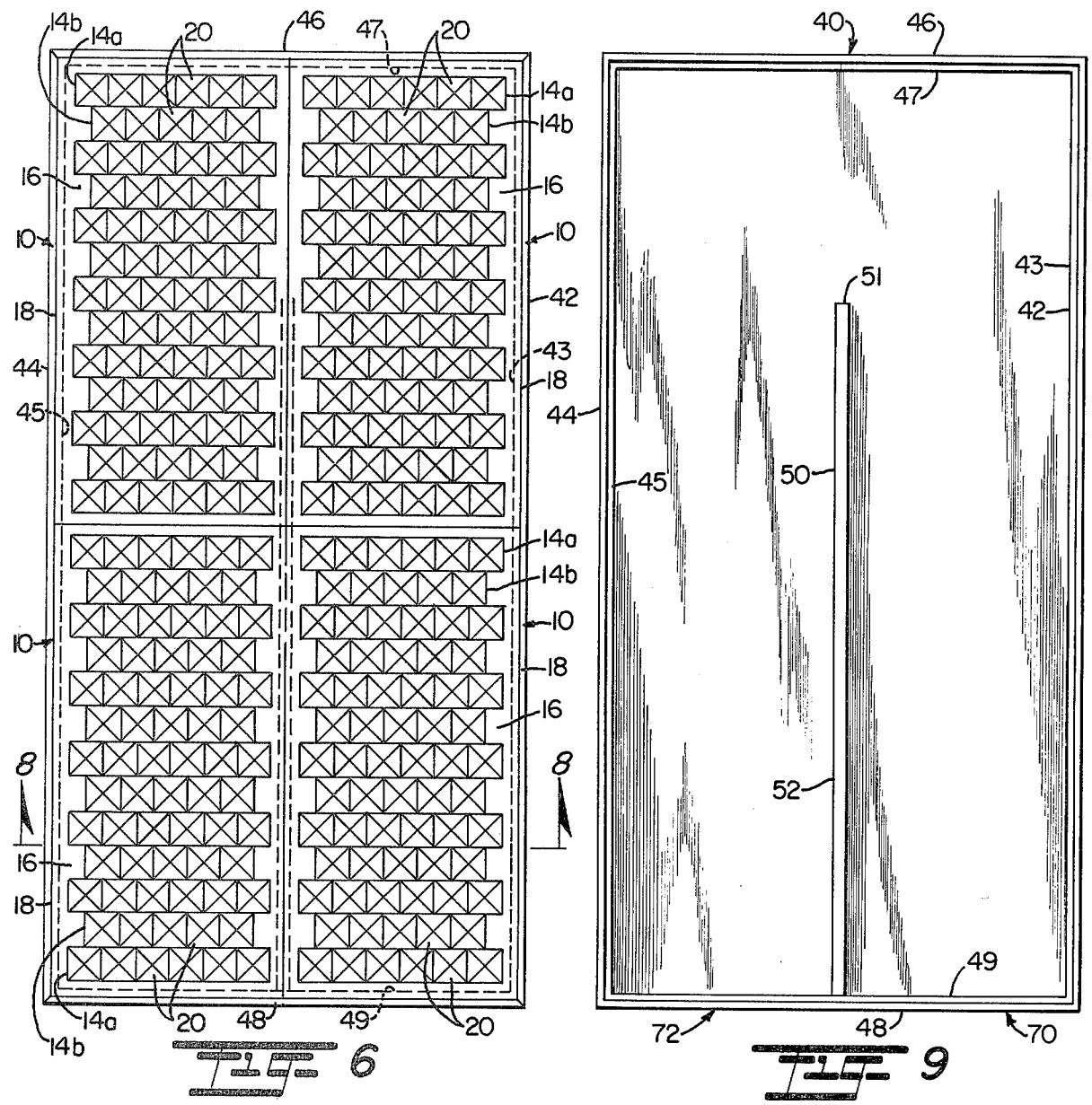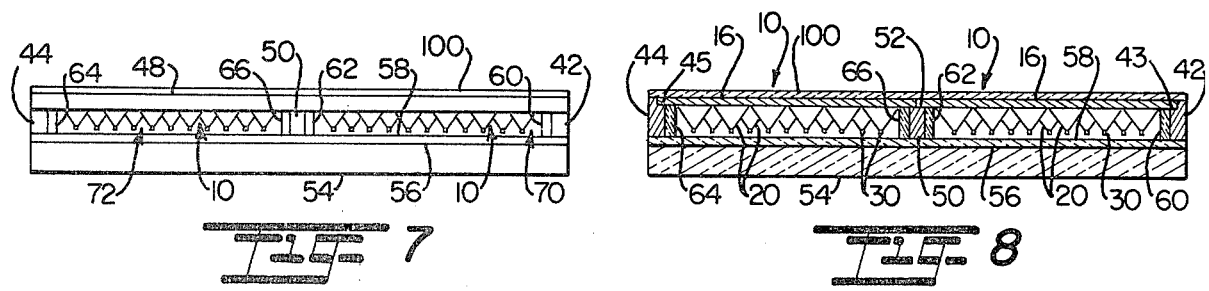

CERAMIC HEAT ABSORPTION PANEL

BACKGROUND OF THE INVENTION

This invention relates generally to solar collector apparatus, and more specifically to solar collector apparatus with a shaped collector surface that increases absorption and heat transfer efficiency for use with low cost materials, such as ceramics.

Solar energy is generally recognized as a potential source of power; however, the collection of the radiant energy from the sun and transforming it for use remains economically marginal. Materials having suitably high absorption and low emissivity characteristics are too expensive for general use. Therefore, the quest has continued for less expensive materials that have acceptable absorption and emissivity characteristics or for specially designed physical features which enhance the absorption and emissivity performance of less expensive materials. Numerous types of collector surfaces have been designed for the latter purpose, most of which have been directed to enhancing the radiation absorption characteristics and heat transfer efficiency of the systems. For example, the U.S. Pat. No. 3,985,116, invented by N. Kapany, the U.S. Pat. No. 3,232,795 invented by R. Gillette et al and the U.S. Pat. No. 4,007,728, invented by P. Guba, utilize truncated polyhedral formations on the panel surface to increase the number of radiation reflecting surfaces and direct them to a critical or common point. U.S. Pat. No. 4,030,477, invented by D. Smith, discloses a panel comprised of a plurality of conical configurations for focusing the radiation to a heat converter element, and U.S. Pat. No. 3,894,685, invented by J. Keyes et al, discloses an absorber panel with cylindrical cups on its surface. However, the economics of solar collector systems that utilize such designs still remains questionable either due to the use of relatively expensive, metallic, materials or high manufacturing costs. The success of such prior art inventions is even less impressive when an air heat transfer medium, rather than a liquid medium is used. In systems employing either type of heat transfer mechanism there is a continuing need for a solar collector panel which is capable of decreasing the emissivity and increasing the heat transfer characteristics of the absorber panel material in an efficient and more economical manner.

SUMMARY OF THE INVENTION

Accordingly, it is an object of the present invention to provide a novel and improved solar absorber panel having a surface physical configuration which decreases emissivity and increases the heat transfer characteristics of the absorber panel material.

It is also an object of the present invention to provide a solar absorber panel possessing improved capabilities to transfer absorbed heat in the absorber panel to an air transfer medium.

It is another object of the present invention to utilize the natural focus energy transfer characteristics of a "Cheops" pyramid-shaped formation to increase the efficiency of a solar collector panel.

It is still another object of the present invention to provide a solar absorber panel fabricated of relatively inexpensive material, such as low cost ceramic compositions, and is sufficiently efficient to complete economically with fossil fuel heating sources.

The solar collector apparatus of the present invention includes a ceramic solar radiation absorber panel having formed therein a plurality of hollow, pyramidal-shaped formations or elements which are inverted to present outwardly divergent, open bases oriented toward the sun for collecting the solar radiation. The apex of each pyramidal formation extends away from the sun into an air duct formed by a frame assembly which supports the absorber panel and conducts a flow of air under the absorber panel in contact with the apices of the pyramidal elements for efficiently transferring the heat in the absorber panel to the air transfer medium. A generally cylindrical-shaped projection protrudes axially from the apex in a direction away from the open base of each pyramidal-shaped element to increase the effective contact or transfer surface area between the apices of the element and the air flow. The ceramic material in the absorber panel preferably is dyed either black or elm green to achieve optimum absorption characteristics. The frame assembly has an insulated back panel as well as insulated side members, and a double-glazed glass panel is interposed over the surface of the absorber panel between the absorber panel and the sun.

Other objects, advantages and features of the present invention will become more readily appreciated and understood when taken together with the following detailed description in conjunction with the accompanying drawings, in which:

BRIEF DESCRIPTION OF THE DRAWINGS

FIG. 6 shows four of the absorber panels on the present invention assembled together to form a solar collector panel in accordance with the present invention;

FIG. 7 is an end view in elevation of the solar collector panel;

FIG. 8 is a cross-sectional view of the solar collector panel taken along lines 8—8 of FIG. 6;

FIG. 9 is a plan view of the frame portion of the solar collector panel; and

DETAILED DESCRIPTION OF THE PREFERRED EMBODIMENT

Figure 1:
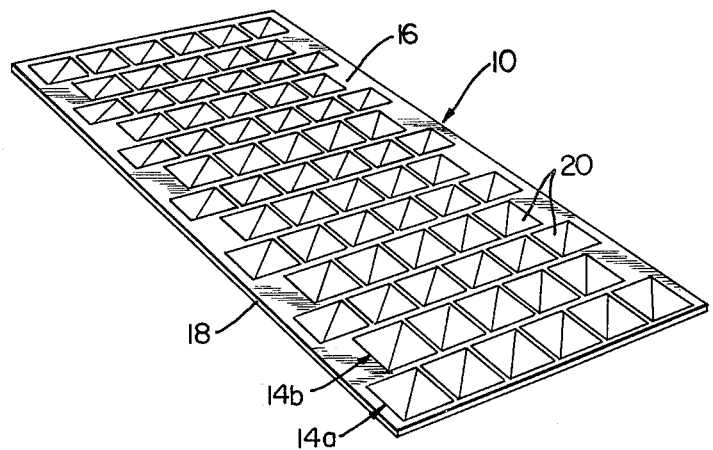
FIG. 1 is a perspective view of the absorber panel of the present invention.
Figure 2:
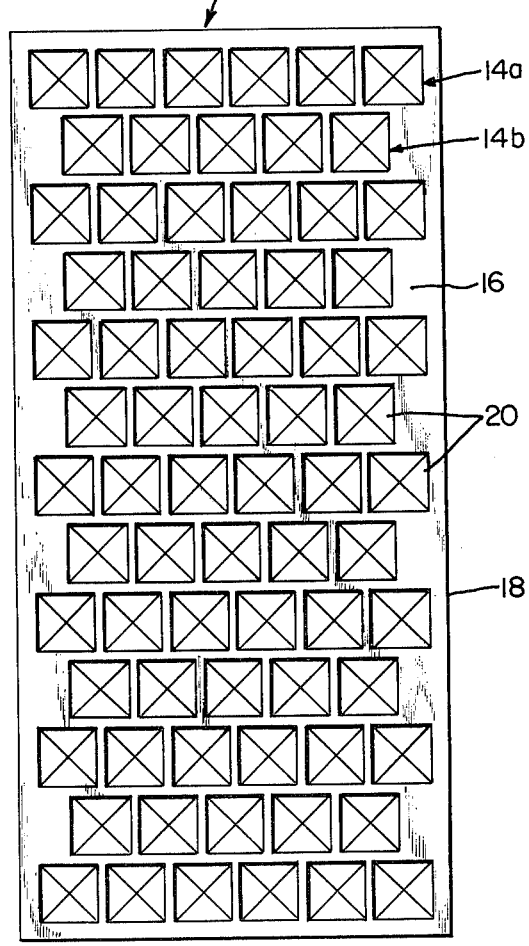
FIG. 2 is a plan view of the absorber panel.
Figure 5:
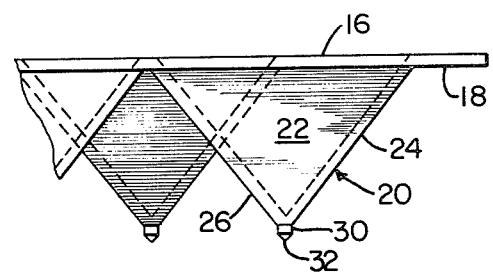
FIG. 5 is an enlarged fragmentary view of the portion of the absorber panel shown in FIG. 4.
Figure 4:
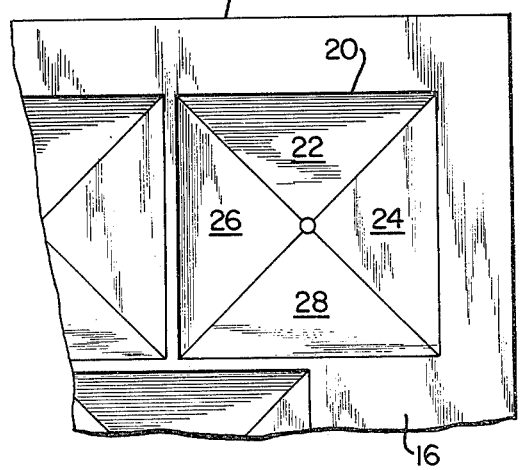
FIG. 4 is an enlarged, fragmentary bottom plan view of a corner of the absorber panel.
Figure 3:
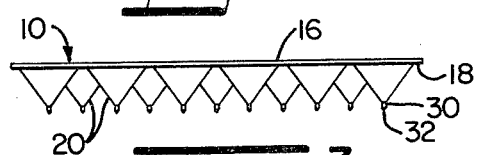
FIG. 3 is an end view in elevation of the absorber panel.

The solar collector panel 10 according to the present invention is illustrated in perspective view in FIG. 1 and in plan view in FIG. 2. It is comprised of a generally rectangular ceramic panel 16 having an outer rim 18 and a plurality of hollow, inverted pyramidal-shaped elements formations 20 extending downwardly and away from a flat upper surface of panel 16. The configuration of the pyramidal-shaped formation 20 is best seen in FIGS. 4 and 5. Each pyramidal-shaped element 20 typically has four sidewalls 22, 24, 26 and 28 converging from the flat panel 16 toward each other and terminating in a downwardly protruding projection 30 of generally cylindrical cross-section, which is conically tapered at its distal end to a point 32.

In the preferred application, a solar collector panel according to the present invention is comprised of four of the absorber panels 10 positioned in abutting relation to one another in a common collector panel frame 40, as shown in FIG. 6, so that their upper surfaces are all in a common plane. The frame 40 is best shown in FIGS. 7 through 9, and includes a rectangular frame, preferably fabricated of wood, having a right sidewall 42, left sidewall 44, upper end wall 46, and lower end wall 48. The right side wall 42 has a ledge 43 routed or formed on its inside, upper surface to support the rim 18 on the right side of an absorber panel 10. Similarly, the left sidewall 44 has a ledge 45 routed from its top inside edge, upper end panel 46 has a ledge 47 routed in its upper inside edge, and lower end wall 48 has a ledge 49 routed in its upper inside edge. A common center support member extends longitudinally through the midsection of the frame 40 from the lower end member 48 toward the upper end frame 46 and terminates in a distal end 51 a spaced distance from the upper end member 46. The top surface 52 of the center support member 50 lays in a common plane with the routed ledges 43, 45, 47 and 49 and serves as a center support for the adjacent inside edges of the four absorber panels 10 when they are placed in position in the frame 40, as best seen in FIGS. 6 and 8.

Figure 10:
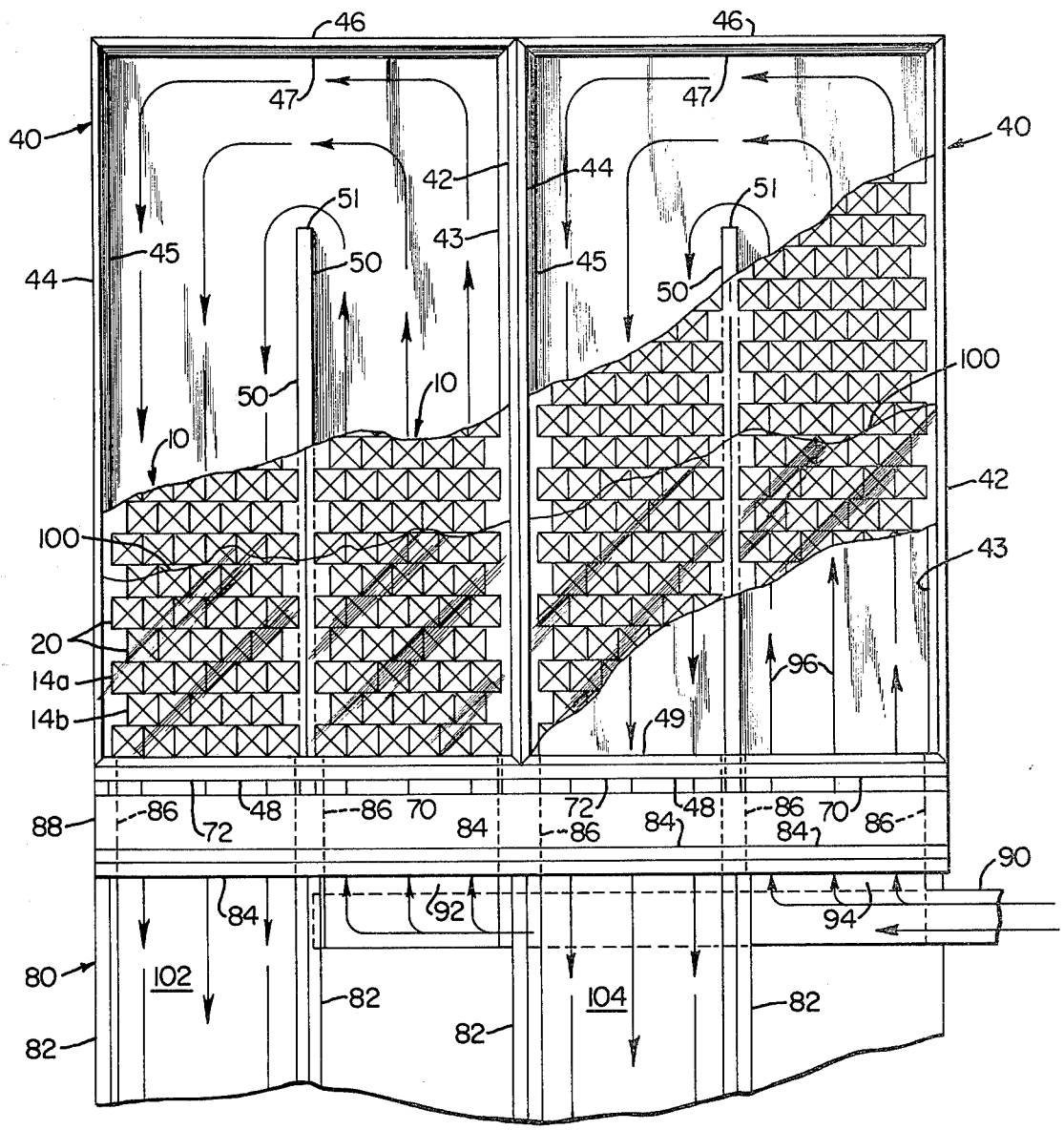
FIG. 10 illustrates a pair of the solar collector panels of the present invention mounted adjacent each other in a typical manner as contemplated by this invention, and it also shows the inlet and outlet duct configuration and air flow pattern.

The frame 40 is also supported on a back wall 54 which is preferably fabricated of a relatively thick panel of polystyrene insulating material. An intermediate insulating panel 56 having a polyurethane foam core and a reflective surface 58 is positioned over the back wall 54 and directly beneath the frame members 42, 44, 46 and 48 to provide additional ininsulation as well as to serve as a reflective surface for reflecting any radiant energy passing through or radiated by the collector panels 10 back toward the panels 10 to minimize heat loss. Additional insulation, preferably polyurethane foam sheets, is provided along the sidewalls of the frame 40 by insulating sheets 60, 62, 64 and 66, as best seen in FIGS. 7 and 8. Double-glazed glass or other transparent sheets 100 are positioned over the surface of the absorber panel, as shown in FIG. 10. The glass sheets 100 freely transmit solar radiation therethrough to the absorber panel 10, but they do not transmit infrared radiation, thereby effectively retaining the heat in the vicinity of the absorber panel surface in the collector apparatus.

In operation, the solar collector panel is positioned such that the rays of the sun impinge the upper surface of the absorber panel 10, which is the surface of the panel having the recessed inside portions of the pyramidal shaped formation 20 opening therein. The sun's radiation is absorbed by the absorption panel 10 and is transformed into heat.

A flow of air is forced into the collector panel through the inlet opening 70, shown in FIG. 7, and continues its flow in the channel or space formed between the undersurface of the absorber panel 10, the back wall 54, center support member 50, and right frame member 42. The air flow continues toward the upper end of the collector panel, through the space between the distal end 51 of the center support member 50 and upper end frame member 46, and then continues downwardly between the center support member 52 and the left frame member 44 to the outlet opening 72, shown in FIG. 7.

When cool air is forced through the collector panels as described, it comes in contact with the plurality of pyramidal-shaped formations 20 projecting downwardly into the air flow channel resulting in heat transfer from the absorber panel 20 to the air as the air flows through the collector panel. Consequently, cool air introduced into the panel through inlet 70 and circulated through the collector panel as described above will exit the collector panel through the outlet opening 72 in a heated condition when the upper surface of the absorber panel 10 is exposed to sun radiation.

It is preferred that each pyramidal-shaped element is identical with each side 22, 24, 26, 28 having an angle of inclination of about 51° 51', with its perimeter equal to two pi times its altitude ($p = 2\pi h$, where p is perimeter and h is altitude). Such a pyramid, commonly known as the "Cheops" pyramid, is a natural shaped focus and tends to transmit whatever form of energy is introduced into its base to its apex. The cylindrical members or projections 30 at the apex of each pyramidal-shaped formation 20 further extend the sphere of concentration at the apex of the pyramid to increase the effective heat exchange through the absorber to the air transfer medium. The pyramidal-shaped elements 20 are preferably arranged in staggered rows 14a, 14b as best seen in FIG. 6, with the pyramidal formations 20 of one row 14a being offset one-half the width of the pyramidal formations 20 in relation to the longitudinal direction of air flow through the collector panels. This offset or staggered positioning of the pyramidal elements 20 causes the air flow near the bases of the pyramidal elements 20 to be extremely turbulent, with decreasing turbulence to near-laminar flow around the cylindrical projections 30 at the apices of the respective pyramidal elements 20. The air flow will therefore tend to be stronger of the apices of the pyramidal formations resulting in a high rate of heat exchange from the apices and cylindrical projections 30 therefrom. Consequently, since the natural shaped focus of the pyramidal formations 20 tend to conduct the heat in the absorber panel away from the top surface toward the undersurface, and the heat transfer is maximized at the apexes of the respective pyramidal formations by the cylindrical projections 30 and laminar flow of air thereby, the energy loss from reradiation of the absorber panel is significantly lower than that usually experienced in prior art collector panels.

Because of the superior heat transfer characteristics of the absorber panel 10 as just described, the absorber panel 10 can be satisfactorily fabricated of a ceramic material which is relatively cheap and economical to manufacture in comparison to the materials customarily used in prior art solar absorbers.

For purposes of example, and not of limitation, it has been found quite satisfactory to use a relatively low grade, porous ceramic material for the absorber panel 10. Such a ceramic material can be made using approximately 100 lbs. of conventional casting body, such as Westwood casting body, manufactured by Westwood Industries, City of Industry, Calif. 5½ gals. of water, 4 oz. of sodium carbonate, and 4 oz. of sodium silicate. The absorber can be formed in a potter's plaster mold, and simple Bisque firing at approximately 1800° F. is sufficient. A rougher or more porous ceramic panel is preferable to a more refined, smooth panel for absorbing radiant energy and for retaining a dye or pigment. The ceramic panels can then be dipped in a dye having a highly absorptive color, such as black or elm green.

An additional surface coat of highly absorbent color can also be applied to increase the absorptivity if desired.

The absorber panel of the present invention can also be fabricated of other materials, such as plastic or metal. However, such materials generally require the use of injection molding or extrusion manufacturing processes, which are much more expensive than block molding ceramics, and they are more difficult to dye or color with more than just a surface treatment.

Each absorber panel is approximately 47" long and 23" wide, and the pyramidal-shaped elements are about 2.4" in height. The side frame members 42, 44, the upper end member 46 and the center support member 50 are fabricated of Douglas Fir wooden 2×4 members. The lower end member 48 is preferably fabricated of a 2×2 wood member to allow space for the air inlet 70 and outlet 72. The frame members are routed ¾" deep to provide the ledges 43, 45, 47, 49, and the center support member 50 is planed down ¾" to correspond to the routed ledges. The back wall is preferably fabricated of a 3" thick polystyrene sheet with an overlay of 3/16" polyurethane foam insulation panel having a foil reflective surface 58. The side insulating sheets 60, 62, 64, 66 are preferably fabricated of 1" thick polystyrene sheets.

A preferred solar collector installation is shown in FIG. 10, wherein two of the solar collector apparatus of the present invention, each comprised of four absorber panels 10 on a frame assembly 40, are positioned adjacent each other over a building frame wall structure 80. The frame will structure 80 is typically comprised of spaced-apart vertical studs 82 with horizontal top plates 84, rim joists 86, 88 extending above the top plates 84. An air duct 90 runs horizontally under the solar collectors with vertical sections 92, 94 extending upwardly to the inlet openings 70 of the respective collector panels. Cold air is carried to the collectors in this manner. The outlet openings 72 of the collectors are connected to and in communication with respective ducts 102, 104 which carries away the heated air from the collectors. The air transfer medium flows from the duct 90 and through the collectors as indicated by the arrows 96. A double-glazed glass sheet 100 is positioned over the absorber panels 10 to decrease the loss of heat energy from the absorber panels 10 to the atmosphere.

Although the present invention has been described with a certain degree of particularity relative to the foregoing detailed description of the preferred embodiment, various modifications, changes additions and applications other than those specifically mentioned herein will be readily apparent to those having normal skill in the art without departing from the spirit and scope of this invention.

What is claimed is:

1. Solar collector apparatus for collecting and converting solar radiation to heat, comprising an absorber panel having a plurality of inverted, adjacent, hollow pyramidal-shaped elements having open bases in a common plane with the base of each pyramidal-shaped formation oriented toward the source of solar radiation, and each pyramidal-shaped element having heat-absorbing sidewalls and terminating in an apex oriented away from the source of radiation, said apex including a tip end portion projecting away from said apex in a direction away from the source of solar radiation, a frame assembly having side enclosure members and a back panel attached to the bottom edges of said enclosure members, said absorber panel being position on and supported by the upper edge of said frame assembly with the apices of said pyramidal-shaped elements depending downwardly into the interior of said frame assembly, and an inlet opening and an outlet opening to accomodate flow of air into, through and out of the interior of said frame assembly, said air flow being in proximity to and in contact with the apices of said pyramidal-shaped elements in the interior of said frame assembly.

2. The solar collector apparatus of claim 1, said tip end projection defined by a cylindrical projection 30 protruding downwardly from the apex of each of said pyramidal-shaped elements.

3. The solar collector apparatus of claim 2, wherein the distal end of each of said cylindrical portions is tapered.

4. The solar collector apparatus of claim 3, wherein each of said pyramidal-shaped elements is in the form of a "Cheops" pyramid, the angle of inclination of each of its sides being about 51° 51', with the perimeter of its base being equal to two pi times its altitude.

5. The solar collector apparatus of claim 4, wherein said pyramidal formations are arranged in a plurality of rows, the pyramidal elements in each of said rows being staggered from the pyramidal elements in adjacent of said rows.

6. The solar collector apparatus of claim 5, including a partition extending through a portion of the interior of said frame assembly from one side toward the side diametrically opposite said one side forming an air flow duct through said frame assembly with said inlet opening on one side of said partition and said outlet opening on the other side of said partition.

7. The solar collector apparatus of claim 6, wherein said absorber panel is fabricated of a bisque-fired ceramic material.

8. The solar collector apparatus of claim 7, wherein said back panel is fabricated of a closed cell synthetic foam insulating material, said sides and said partition are lined with an insulation material, and a double-glazed glass cover overlies said absorber panel.

9. A solar collector absorber panel, comprising a plurality of hollow, pyramidal-shaped elements each having an open base positioned substantially in a common plane with the bases of the other of said pyramidal-shaped elements, each said base adapted to be oriented toward the sun for receiving and absorbing radiant energy from the sun, and each pyramidal element having inclined heat-absorbing sides converging away from the sun to terminate in an apex extending in the opposite direction away from the sun each apex including an elongated tip end member protruding from the apex of each pyramidal-shaped element in a direction away from the sun; and a frame assembly including fluid conducting means for the flow of fluid in heat exchange relation to said elongated tip end members.

10. The solar collector absorber panel of claim 9 wherein said pyramidal-shaped elements are arranged in staggered, offset relation to adjacent of said pyramidal-shaped elements.

11. The solar absorber panel of claim 9, wherein each of said pyramidal-shaped elements is composed of a bisque-fired ceramic material in the form of a "Cheops" pyramid with each of its sides inclined at an angle of about 51° 51', the perimeter of its base being equal to two pi times its altitude.

12. The solar absorber panel of claim 11, wherein the ceramic material is a low grade, porous ceramic material, bisque fired at approximately 1800° F., and dyed a dark, absorbent color.

* * * * *

UNITED STATES PATENT AND TRADEMARK OFFICE
CERTIFICATE OF CORRECTION

PATENT NO. : 4,254,760

DATED : March 10, 1981

INVENTOR(S) : Robert A. Sirimarco

It is certified that error appears in the above—identified patent and that said Letters Patent is hereby corrected as shown below:

Column 3, line 8, cancel "shown" and substitute -- seen --.

Column 4, line 35, cancel "of" and substitute -- at --.

Column 5, line 30, cancel "will" and substitute -- wall --.

Signed and Sealed this

Twenty-fifth Day of August 1981

[SEAL]

Attest:

Attesting Officer

GERALD J. MOSSINGHOFF

Commissioner of Patents and Trademarks